(12) United States Patent
Shei et al.

(10) Patent No.: US 11,041,616 B2
(45) Date of Patent: Jun. 22, 2021

(54) LIGHTING MODULE AND DISPLAY DEVICE

(71) Applicant: E Ink Holdings Inc., Hsinchu (TW)

(72) Inventors: Tsai-Wei Shei, Hsinchu (TW); Yen-Ze Huang, Hsinchu (TW); Ching-Huan Liao, Hsinchu (TW); Yu-Chuan Wen, Hsinchu (TW); Sheng-Chieh Tai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/023,388

(22) Filed: Sep. 17, 2020

(65) Prior Publication Data

US 2021/0080098 A1    Mar. 18, 2021

(30) Foreign Application Priority Data

Sep. 17, 2019  (TW) .................. 108133446

(51) Int. Cl.
| | | |
|---|---|---|
| *F21V 31/00* | (2006.01) | |
| *G06F 1/16* | (2006.01) | |
| *F21K 9/61* | (2016.01) | |
| *F21Y 115/10* | (2016.01) | |

(52) U.S. Cl.
CPC .............. *F21V 31/005* (2013.01); *F21K 9/61* (2016.08); *G06F 1/1656* (2013.01); *F21Y 2115/10* (2016.08)

(58) Field of Classification Search
CPC ......... F21V 31/005; F21K 9/61; G06F 1/1656
See application file for complete search history.

(56) References Cited

U.S. PATENT DOCUMENTS

| | | |
|---|---|---|
| 6,684,581 B2 | 2/2004 | Robinson et al. |
| 6,867,827 B2 | 3/2005 | Cha et al. |
| 7,033,063 B2 | 4/2006 | Cha et al. |
| 8,547,011 B2 | 10/2013 | Yamada et al. |
| 8,651,690 B2 | 2/2014 | Wu |
| 8,749,732 B2 | 6/2014 | Ji et al. |
| 8,752,274 B2 | 6/2014 | Hu et al. |

(Continued)

FOREIGN PATENT DOCUMENTS

| | | |
|---|---|---|
| CN | 101017710 A | 8/2007 |
| CN | 102122463 A | 7/2011 |

(Continued)

OTHER PUBLICATIONS

Corresponding Taiwan office action dated Jan. 22, 2018.

(Continued)

*Primary Examiner* — Karabi Guharay
(74) *Attorney, Agent, or Firm* — CKC & Partners Co., LLC

(57) ABSTRACT

A lighting module includes a circuit board, a light emitting diode, a light guide plate and a glue material. The light emitting diode is disposed over the circuit board, and the light emitting diode includes a light emitting side surface and a non-light emitting side surface. The light guide plate is substantially parallel to the circuit board, and a portion of the light guide plate is disposed over the circuit board and adjacent to the light emitting side surface of the light emitting diode. The glue material covers and is in contact with the non-light emitting side surface of the light emitting diode and the portion of the light guide plate.

12 Claims, 5 Drawing Sheets

(56) References Cited

U.S. PATENT DOCUMENTS

| | | |
|---|---|---|
| 9,442,238 B2 | 9/2016 | Chen et al. |
| 10,129,994 B1 | 11/2018 | Sulem et al. |
| 10,485,127 B1 | 11/2019 | Sulem et al. |
| 10,704,781 B2 | 7/2020 | Shei et al. |
| 2012/0249922 A1 | 10/2012 | Chang et al. |
| 2012/0262647 A1 | 10/2012 | Hu et al. |
| 2013/0010495 A1 | 1/2013 | Moon et al. |
| 2014/0092625 A1 | 4/2014 | Lin et al. |
| 2014/0369067 A1 | 12/2014 | Chen et al. |
| 2015/0155614 A1 | 6/2015 | Youn et al. |
| 2015/0355507 A1 | 12/2015 | Wang |
| 2016/0131822 A1 | 5/2016 | Tai et al. |
| 2017/0139127 A1* | 5/2017 | Zeng ............... G02B 6/005 |
| 2017/0192157 A1 | 7/2017 | Cheng |
| 2018/0292594 A1 | 10/2018 | Lee |
| 2019/0154906 A1* | 5/2019 | Lee ............. G02F 1/133308 |

FOREIGN PATENT DOCUMENTS

| | | |
|---|---|---|
| CN | 102313159 B | 7/2013 |
| CN | 204300846 U | 4/2015 |
| CN | 104949011 A | 9/2015 |
| CN | 205155741 U | 4/2016 |
| CN | 106097907 A | 11/2016 |
| KR | 101089791 B1 | 12/2011 |
| TW | 201415130 A | 4/2014 |
| TW | 201500815 A | 1/2015 |
| TW | I631297 B | 8/2018 |

OTHER PUBLICATIONS

Corresponding Taiwan office action dated Apr. 9, 2020.
Office action of U.S. Appl. No. 15/951,189 dated Jan. 2, 2020.
Corresponding Chinese office action dated Jul. 3, 2020.

* cited by examiner

LIGHTING MODULE AND DISPLAY DEVICE

CROSS-REFERENCE TO RELATED APPLICATION

This application claims priority to Taiwan Application Serial Number 108133446, filed Sep. 17, 2019, which is herein incorporated by reference.

BACKGROUND

Field of Invention

The present invention relates to a lighting module and a display device including the lighting module.

Description of Related Art

Most of the existing lighting modules do not have waterproof structures and thus are vulnerable to moisture, resulting in short circuits or corrosion. Therefore, how to make the lighting module have good waterproof performance is an urgent issue in the art.

SUMMARY

The purpose of the present invention is to provide a lighting module with good waterproof performance and low manufacturing cost. Since a glue material with filling ability and curing ability is used to cover and be in contact with a non-light emitting side surface of a light emitting diode and a portion of a light guide plate adjacent to a light emitting side surface of the light emitting diode, moisture cannot enter surroundings of the light emitting diode, and thus the lighting module of the present invention has good waterproof performance. In addition, as long as the glue material is used, the lighting module can have good waterproof performance, and thus the manufacturing cost of the lighting module of the present invention is lower than that of the lighting module including multiple waterproof materials.

The present invention provides a lighting module, which includes a circuit board, a light emitting diode, a light guide plate, and a glue material. The light emitting diode is disposed over the circuit board, and the light emitting diode includes a light emitting side surface and a non-light emitting side surface. The light guide plate is substantially parallel to the circuit board, in which a portion of the light guide plate is disposed over the circuit board and adjacent to the light emitting side surface of the light emitting diode. The glue material covers and is in contact with the non-light emitting side surface of the light emitting diode and the portion of the light guide plate.

According to some embodiments of the present invention, the glue material covers and is in contact with an upper surface of the portion of the light guide plate.

According to some embodiments of the present invention, the glue material further covers and is in contact with a portion of the light emitting side surface of the light emitting diode.

According to some embodiments of the present invention, the portion of the light guide plate is in contact with the circuit board.

According to some embodiments of the present invention, the light emitting diode further includes a non-light emitting top surface, and the glue material does not cover the non-light emitting top surface of the light emitting diode.

According to some embodiments of the present invention, a height of the glue material covering the non-light emitting side surface of the light emitting diode is less than or equal to a height of the light emitting diode.

According to some embodiments of the present invention, the glue material is further disposed between the portion of the light guide plate and the circuit board.

According to some embodiments of the present invention, the light emitting diode further includes a non-light emitting top surface, and the glue material further covers and is in contact with the non-light emitting top surface of the light emitting diode.

According to some embodiments of the present invention, the glue material includes a side surface on the portion of the light guide plate, and an inner angle between the side surface and an upper surface of the portion of the light guide plate is less than 90 degrees.

According to some embodiments of the present invention, the glue material is formed by dispensing, coating, injection molding or hot pressing molding.

According to some embodiments of the present invention, the glue material includes light-curing resin, heat-curing resin, moisture-curing resin or a combination thereof.

According to some embodiments of the present invention, the glue material includes silicon resin, epoxy, Novolac, rubber, polymethylmethacrylate (PMMA), phenol resin, polyester, polyurethane (PU), polyethylene (PE), polypropylene (PP), polystyrene (PS), acrylonitrile-butadiene-styrene (ABS), polycarbonate (PC), polyethylene terephthalate (PET) or a combination thereof.

The present invention also provides a display device, which includes the aforementioned lighting module and a display panel disposed over a surface of the light guide plate.

BRIEF DESCRIPTION OF THE DRAWINGS

In order to make the above and other objects, features, advantages and embodiments of the present invention more obvious and easy to understand, please read the following detailed description with the corresponding drawings.

DETAILED DESCRIPTION

Figure 1:
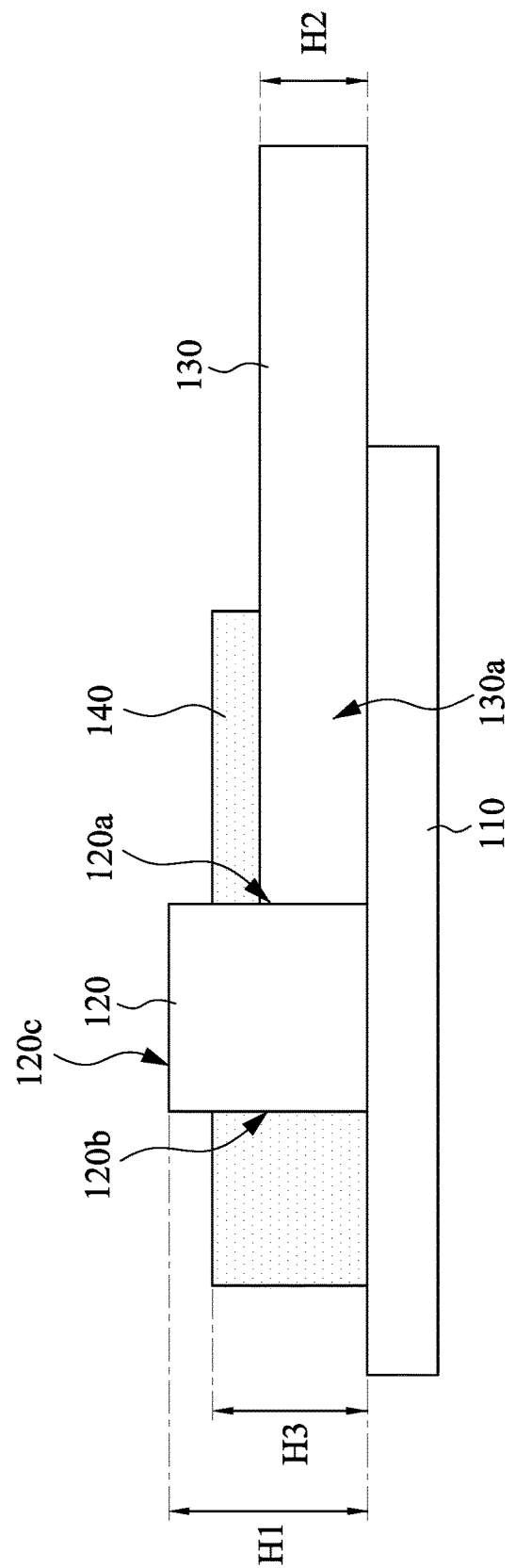
FIG. 1 is a schematic cross-sectional view of a lighting module according to an embodiment of the present invention.

The following disclosure provides many different embodiments or examples, for implementing different technical features of the provided subject matter. Specific examples of components and arrangements are described below to simplify the present invention. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations), and the spatially relative descriptions used herein may likewise be interpreted accordingly.

In this specification, "substantially parallel" is defined that two elements are completely parallel to each other or with a deviation of ±5°.

The purpose of the present invention is to provide a lighting module with good waterproof performance and low manufacturing cost. Since a glue material with filling ability and curing ability is used to cover and be in contact with a non-light emitting side surface of a light emitting diode and a portion of a light guide plate adjacent to a light emitting side surface of the light emitting diode, moisture cannot enter surroundings of the light emitting diode, and thus the lighting module of the present invention has good waterproof performance. In addition, as long as the glue material is used, the lighting module can have good waterproof performance, and thus the manufacturing cost of the lighting module of the present invention is lower than that of the lighting module including multiple waterproof materials.

The lighting module of the present invention can be applied to a backlight module or a front light module of a display panel. A light guide plate of the lighting module may be disposed over a back surface or a display surface of the display panel. Various embodiments of the lighting module will be detailed below.

FIG. 1 is a schematic cross-sectional view of a lighting module according to an embodiment of the present invention. As shown in FIG. 1, the lighting module 100 includes a circuit board 110, a light emitting diode 120, a light guide plate 130 and a glue material 140.

In some embodiments, the circuit board 110 is a flexible printed circuit board (FPC), a rigid printed circuit board (PCB), or a combination thereof. In some embodiments, the circuit board 110 includes one or more insulating layers, one or more metal layers, and one or more circuit layers.

The light emitting diode 120 is disposed over the circuit board 110. The light emitting diode 120 has a light emitting side surface 120a and a non-light emitting side surface 120b. In some embodiments, the light emitting diode 120 has one light emitting side surface 120a and a plurality of non-light emitting side surfaces. FIG. 1 shows the non-light emitting side surface 120b opposite to the light emitting side surface 120a.

In some embodiments, the lighting module 100 includes a plurality of light emitting diodes (FIG. 1 only shows a cross-section of the one light emitting diode 120 of the light emitting diodes), and the circuit board 110 and the light emitting diodes constitute a light bar.

The light guide plate 130 is substantially parallel to the circuit board 110. A portion 130a of the light guide plate 130 is adjacent to the light emitting side surface 120a of the light emitting diode 120. The portion 130a of the light guide plate 130 may also be referred to as a front edge portion. In some embodiments, as shown in FIG. 1, the portion 130a of the light guide plate 130 is in contact with the circuit board 110.

In some embodiments, the light emitting diode 120 has at least one contact (not shown), and the contact may also be referred to as a soldering point. In some embodiments, the contact of the light emitting diode 120 is disposed between a bottom surface of the light emitting diode 120 and the circuit board 110. The contact includes a metallic material and is easily damaged by moisture. Therefore, the present invention uses the glue material 140 with good filling ability and curing ability to cover and be in contact with the non-light emitting side surface 120b of the light emitting diode 120 and the portion 130a of the light guide plate 130 adjacent to the light emitting side surface 120a of the light emitting diode 120, and thus the moisture cannot enter surroundings of the light emitting diode 120 to effectively prevent the contact from being damaged by moisture.

In some embodiments, the glue material 140 may be formed by dispensing, coating, injection molding, or hot pressing molding.

In some embodiments, the dispensing method is to make a fluid glue material attach to the substrate 110, the light guide plate 130, and/or the light emitting diode 120 by using syringe injection or ink jet, and a curing treatment is then performed to form the glue material 140.

In some embodiments, the coating method is to make a fluid glue material attach to the substrate 110, the light guide plate 130, and/or the light emitting diode 120 by using screen printing, and a curing treatment is then performed to form the glue material 140.

In some embodiments, the injection molding method is to inject a fluid glue material onto the substrate 110, the light guide plate 130, and/or the light emitting diode 120 in a low pressure injection manner, and after cooling the glue material 140 is formed.

The hot press molding method may also be referred to as compression molding. In some embodiments, the hot pressing molding method is to hot press and melt a sheet-shaped glue material and then place it on the substrate 110, the light guide plate 130, and/or the light emitting diode 120, and after cooling the glue material 140 is formed.

In some embodiments, the glue material 140 is a transparent glue material. In some embodiments, the glue material 140 includes a light curing resin (e.g., an ultraviolet light curing resin, an infrared light curing resin, or a visible light curing resin), a heat curing resin, a moisture curing resin, or a combination thereof.

In some embodiments, the glue material 140 includes silicon resin, epoxy, Novolac, rubber, polymethylmethacrylate (PMMA), phenol resin, polyester, polyurethane (PU), polyethylene (PE), polypropylene (PP), polystyrene (PS), acrylonitrile-butadiene-styrene (ABS), polycarbonate (PC), polyethylene terephthalate (PET) or a combination thereof, but not limited thereto.

In some embodiments, as shown in FIG. 1, a height H1 of the light emitting diode 120 is greater than or equal to a height H2 of the light guide plate 130. In some embodiments, a ratio of the height H1 of the light emitting diode 120 to the height H2 of the light guide plate 130 is between 5:1 and 1:1. In some embodiments, the height H1 of the light emitting diode 120 is in a range of from 0.2 mm to 0.5 mm, and the height H2 of the light guide plate 130 is in a range of from 0.1 mm to 0.4 mm.

In some embodiments, as shown in FIG. 1, the glue material 140 covers and is in contact with an upper surface of the portion 130a of the light guide plate 130 adjacent to the light emitting side surface 120a of the light emitting diode 120. In some embodiments, the glue material 140 further covers and is in contact with a portion of the light emitting side surface 120a of the light emitting diode 120.

In some embodiments, as shown in FIG. 1, a height H3 of the glue material 140 covering the non-light emitting side surface 120b of the light emitting diode 120 is less than or equal to the height H1 of the light emitting diode 120. In some embodiments, the height H3 of the glue material 140 covering the non-light emitting side surface 120b of the light emitting diode 120 is in a range of from 0.3 mm to 0.5 mm. In some embodiments, as shown in FIG. 1, the light emitting diode 120 further includes a non-light emitting top surface 120c, and the glue material 140 does not cover the non-light emitting top surface 120c of the light emitting diode 120.

Figure 2:
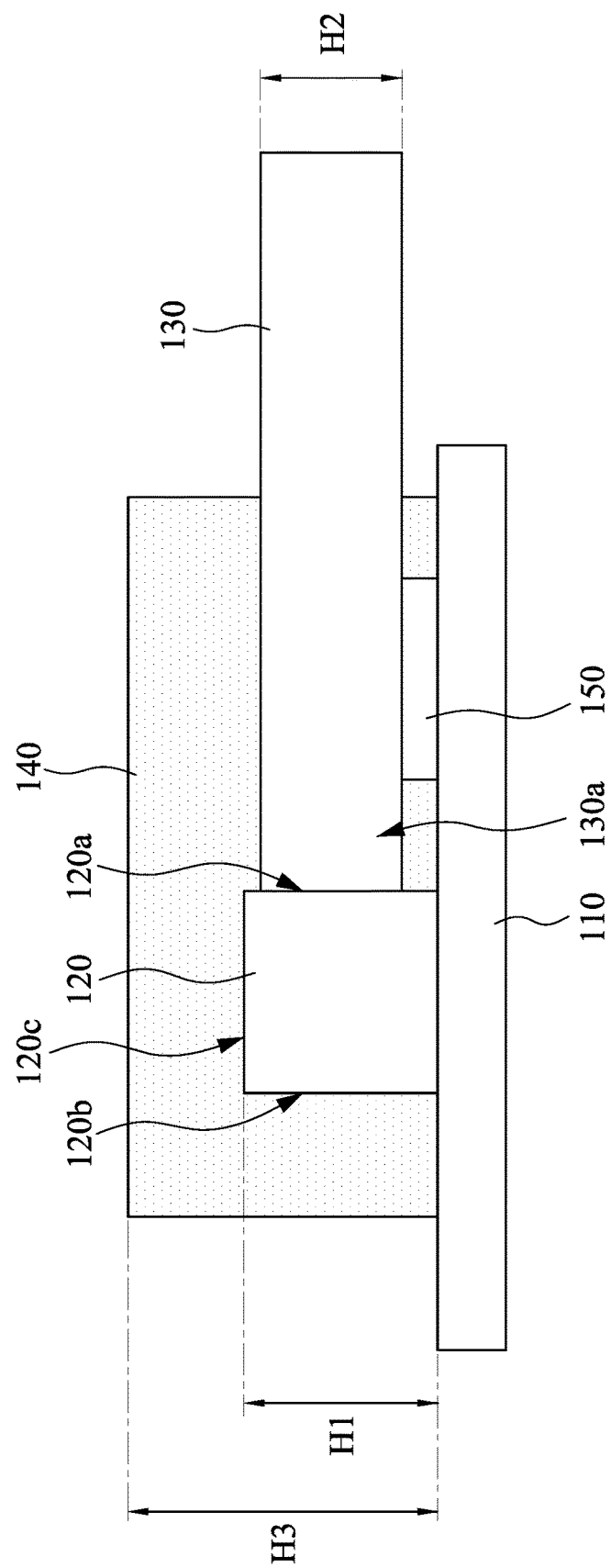
FIG. 2 is a schematic cross-sectional view of a lighting module according to another embodiment of the present invention.

FIG. 2 is a schematic cross-sectional view of a lighting module according to another embodiment of the present invention. The difference between the embodiment of FIG. 2 and the embodiment of FIG. 1 is that the glue material 140 is further disposed between the portion 130a (i.e., the front edge portion) of the light guide plate 130 and the circuit board 110, and the glue material 140 further covers and is in contact with the non-light emitting top surface 120c of the light emitting diode 120. In some embodiments, the lighting module 100 further includes a double-sided adhesive tape 150 disposed between the portion 130a of the light guide plate 130 and the circuit board 110, and the double-sided adhesive tape 150 is adjacent to the glue material 140.

Figure 3:
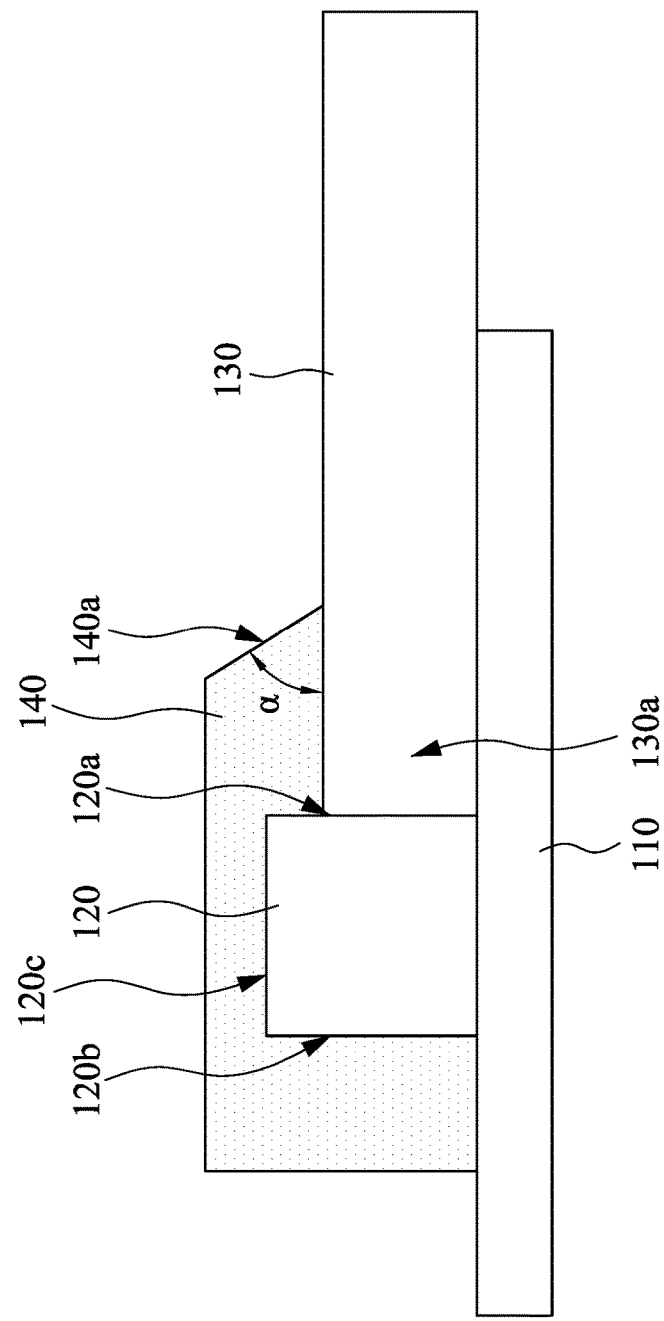
FIG. 3 is a schematic cross-sectional view of a lighting module according to another embodiment of the present invention.

FIG. 3 is a schematic cross-sectional view of a lighting module according to another embodiment of the present invention. The difference between the embodiment of FIG. 3 and the embodiment of FIG. 1 is that the glue material 140 has a side surface 140a on the portion 130a (i.e., the front edge portion) of the light guide plate 130, and an inner angle α between the side surface 140a and the upper surface of the portion 130a of the light guide plate 130 is less than 90 degrees. In some embodiments, a portion of light emitted by the light emitting diode 120 does not enter the light guide plate 130 but enters the glue material 140, and the portion of the light can be reflected by the inclined side surface 140a and enter the light guide plate 130, so that the lighting module of the present invention has good optical performance.

Figure 4:
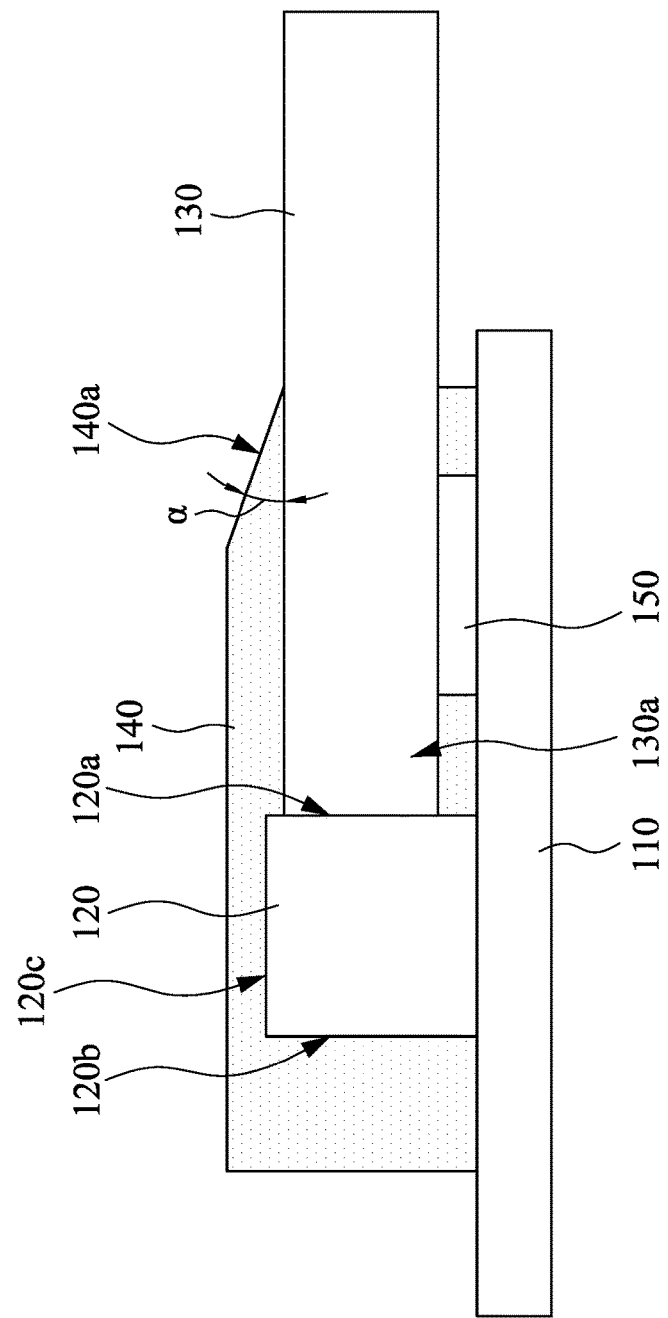
FIG. 4 is a schematic cross-sectional view of a lighting module according to another embodiment of the present invention.

FIG. 4 is a schematic cross-sectional view of a lighting module according to another embodiment of the present invention. The difference between the embodiment of FIG. 4 and the embodiment of FIG. 2 is that the glue material 140 has a side surface 140a on the portion 130a (i.e., the front edge portion) of the light guide plate 130, and an inner angle α between the side surface 140a and the upper surface of the portion 130a of the light guide plate 130 is less than 90 degrees. In some embodiments, a portion of light emitted by the light emitting diode 120 does not enter the light guide plate 130 but enters the glue material 140, and the portion of the light can be reflected by the inclined side surface 140a and enter the light guide plate 130, so that the lighting module of the present invention has good optical performance.

Figure 5:
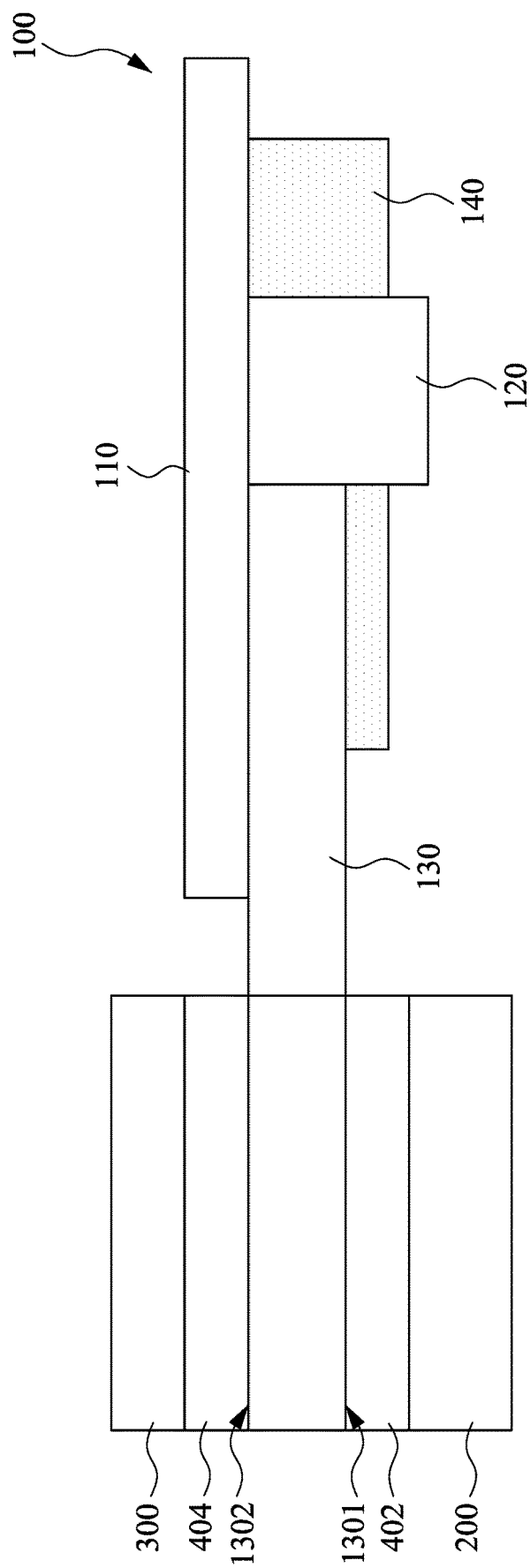
FIG. 5 is a schematic cross-sectional view of a display device according to an embodiment of the present invention.

The present invention also provides a display device. FIG. 5 is a schematic cross-sectional view of a display device according to an embodiment of the invention. As shown in FIG. 5, the display device includes a lighting module 100 and a display panel 200 disposed over a surface 1301 of the light guide plate 130. In some embodiments, the display device further includes a protective layer 300.

The lighting module 100 may be, for example, the lighting module shown in FIGS. 1 to 4. The lighting module 100 shown in FIG. 5 is based on the lighting module 100 shown in FIG. 1 as an example.

The display panel 200 is disposed over the surface 1301 of the light guide plate 130. In some embodiments, the display panel 200 is a liquid crystal display panel, an organic light emitting display panel, an electrowetting display panel, a reflective display panel or an electrophoretic display panel.

In some embodiments, the display panel 200 is disposed over the surface 1301 of the light guide plate 130 through a glue material layer 402. In some embodiments, the glue material layer 402 is an optically clear glue material (OCA).

The protective layer 300 is disposed over another surface 1302 of the light guide plate 130. The surface 1302 and the surface 1301 are opposite to each other. In some embodiments, the protective layer 300 is an anti-glare film (AG film) or a cover lens. In some embodiments, the protective layer 300 is disposed over the surface 1302 of the light guide plate 130 through a glue material layer 404. In some embodiments, the glue material layer 404 is an optically clear glue.

As shown in FIG. 5, since the glue material 140 is provided in the lighting module 100 for covering the light emitting diode 120 and the front edge portion of the light guide plate 130, it can effectively prevent moisture from damaging the light emitting diode 120.

The features of various embodiments are briefly mentioned above, so those skilled in the art can better understand various aspects of the present invention. Those skilled in the art should realize that in order to implement the same purpose and/or achieve the same advantages of the embodiments presented herein, and they can easily use the present invention as a basis for designing or modifying other processes and structures. Those skilled in the art should also understand that these equal constructions do not depart from the spirit and scope of the present invention, and that they can make various changes and substitutions here without departing from the spirit and scope of the present invention.

What is claimed is:

1. A lighting module, comprising:
    a circuit board;
    a light emitting diode disposed over the circuit board, the light emitting diode including a light emitting side surface and a non-light emitting side surface;
    a light guide plate substantially parallel to the circuit board, wherein a portion of the light guide plate is disposed over the circuit board and adjacent to the light emitting side surface of the light emitting diode; and
    a glue material covering and being in contact with the non-light emitting side surface of the light emitting diode and the portion of the light guide plate, wherein the glue material further covers and is in contact with a portion of the light emitting side surface of the light emitting diode.

2. The lighting module of claim 1, wherein the glue material covers and is in contact with an upper surface of the portion of the light guide plate.

3. The lighting module of claim 1, wherein the portion of the light guide plate is in contact with the circuit board.

4. The lighting module of claim 1, wherein the light emitting diode further includes a non-light emitting top surface, and the glue material does not cover the non-light emitting top surface of the light emitting diode.

5. The lighting module of claim 1, wherein a height of the glue material covering the non-light emitting side surface of the light emitting diode is less than or equal to a height of the light emitting diode.

6. The lighting module of claim 1, wherein the glue material is further disposed between the portion of the light guide plate and the circuit board.

7. The lighting module of claim 1, wherein the light emitting diode further includes a non-light emitting top surface, and the glue material further covers and is in contact with the non-light emitting top surface of the light emitting diode.

8. The lighting module of claim 1, wherein the glue material includes a side surface on the portion of the light guide plate, and an inner angle between the side surface and an upper surface of the portion of the light guide plate is less than 90 degrees.

9. The lighting module of claim 1, wherein the glue material is formed by dispensing, coating, injection molding or hot pressing molding.

10. The lighting module of claim 1, wherein the glue material comprises light-curing resin, heat-curing resin, moisture-curing resin or a combination thereof.

11. The lighting module of claim 1, wherein the glue material comprises silicon resin, epoxy, Novolac, rubber, polymethylmethacrylate (PMMA), phenol resin, polyester, polyurethane (PU), polyethylene (PE), polypropylene (PP), polystyrene (PS), acrylonitrile-butadiene-styrene (ABS), polycarbonate (PC), polyethylene terephthalate (PET) or a combination thereof.

12. A display device, comprising:
the lighting module of claim 1; and
a display panel disposed over a surface of the light guide plate.

* * * * *